US006968537B2

(12) United States Patent
Abdelhadi et al.

(10) Patent No.: US 6,968,537 B2
(45) Date of Patent: Nov. 22, 2005

(54) APPARATUS, SYSTEM AND METHOD OF AUTOMATICALLY ASSIGNING MNEMONICS IN A USER INTERFACE

(75) Inventors: Sanaa F. Abdelhadi, Schaumburg, IL (US); Sandip A. Amin, Austin, TX (US); James Lee Lentz, Austin, TX (US); Brian David Nelson, Austin, TX (US); John Diehl Sillers, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 10/125,632

(22) Filed: Apr. 18, 2002

(65) Prior Publication Data

US 2003/0200508 A1   Oct. 23, 2003

(51) Int. Cl.[7] .............................................. G06F 9/44
(52) U.S. Cl. ...................... 717/106; 717/100; 717/109; 715/827; 715/841
(58) Field of Search ........... 717/100, 106–109; 715/732–763, 715/827, 841, 853

(56) References Cited

U.S. PATENT DOCUMENTS

| 5,886,695 A | * | 3/1999 | Chew et al. ................. 715/784 |
| 6,114,978 A | * | 9/2000 | Hoag .......................... 341/23 |
| 2001/0003097 A1 | * | 6/2001 | Jeoung ........................ 455/566 |

* cited by examiner

*Primary Examiner*—Kakali Chaki
*Assistant Examiner*—Jason Mitchell
(74) *Attorney, Agent, or Firm*—Volel Emile; Mark E. McBurney

(57) ABSTRACT

A method, system and apparatus for automatically assigning mnemonics to text strings in a GUI are provided. First, all text strings used in the GUI that are associated with controls requiring mnemonics are stored in a table. Then using common assignment rules, each text string is automatically assigned a unique mnemonic. Text strings that are generally assigned particular mnemonics (i.e., standard mnemonics) are assigned those standard mnemonics. Each mnemonic used is registered into another table to ensure against duplication of mnemonics.

13 Claims, 8 Drawing Sheets

| | TEXT STRINGS | CHARACTER |
|---|---|---|
| FILE | NEW | N |
| | OPEN | O |
| | CLOSE | C |
| | SAVE | S |
| | PRINT | P |
| EDIT | CUT | T |
| | COPY | C |
| | PASTE | P |
| | FIND | F |
| FORMAT | FONT | F |
| | PARAGRAPH | P |
| | COLUMNS | C |
| | TABS | T |
| TABLE | DRAW TABLE | W |
| | INSERT | I |
| | DELETE | D |
| | SELECT | C |

| TEXT STRINGS | CHARACTER |
|---|---|
| FILE | F |
| EDIT | E |
| FORMAT | O |
| TABLE | A |
| HELP | H |

FIG. 5

|  | TEXT STRINGS | CHARACTER |
|---|---|---|
| FILE | NEW | N |
|  | OPEN | O |
|  | CLOSE | C |
|  | SAVE | S |
|  | PRINT | P |
| EDIT | CUT | T |
|  | COPY | C |
|  | PASTE | P |
|  | FIND | F |
| FORMAT | FONT | F |
|  | PARAGRAPH | P |
|  | COLUMNS | C |
|  | TABS | T |
| TABLE | DRAW TABLE | W |
|  | INSERT | I |
|  | DELETE | D |
|  | SELECT | C |

FIG. 6

|  | TEXT STRINGS | CHARACTER |
|---|---|---|
| INSERT | TABLE | T |
| | COLUMN | C |
| | ROW | R |
| DELETE | TABLE | T |
| | COLUMN | C |
| | ROW | R |
| SELECT | TABLE | T |
| | COLUMN | C |
| | ROWS | R |

FIG. 7

| TEXT STRINGS | CHARACTER |
|---|---|
| FILE | F |
| EDIT | E |
| SAVE | S |
| PRINT | P |
| COPY | C |
| HELP | H |

FIG. 8

Function definition: *mnemonic = MnemonicAssignment(LABEL)*
   If {LABEL is in StandardMnemonics} then
        {mnemonic = StandardMnemonics[LABEL, character]
        Add{CharactersUsed, mnemonic)}
     else if (LABEL is in ReoccuringStrings) then
        if (ReoccuringStrings[LABEL, character] <> null) then
            {mnemonic = ReoccuringStrings[LABEL, character]
              Add{CharactersUsed, mnemonic})

else      {mnemonic = ScanChars(LABEL)
            Add(CharactersUsed,mnemonic)
            ReoccuringStrings[Label, character] = mnemonic}
     else (LABEL isn't reoccurring)
     {mnemonic = ScanChars{LABEL}
     Add(CharactersUsed, mnemonic)}
   end if function *char=ScanChars(LABEL)*
     if FirstChan(LABEL) is not in CharactersUsed then
        char = FirstChan{LABEL}
     else
        {search *Connsonants* from first entry to last and set char to first
        character that is in LABEL and *Connsonants* but isn't in
        Characters Used.
        If no connsonants in LABEL haven't already been used, then set
        char to a vowel, if no vowel as haven't been used then ERROR}
     end if

FIG. 9

APPARATUS, SYSTEM AND METHOD OF AUTOMATICALLY ASSIGNING MNEMONICS IN A USER INTERFACE

BACKGROUND OF THE INVENTION

1. Technical Field

The present invention is directed generally to graphical user interfaces (GUIs). More specifically, the present invention is directed to a method and apparatus for automatically assigning mnemonics in a GUI.

2. Description of Related Art

A mnemonic is a feature in computer user interfaces that allows a user to directly access a control in the interfaces by pressing on a special key (usually the "alt" or "ctrl" key) and a character. The character is usually an underscored character in a text label that is associated with the control. A control is an item that can be individually selected in a window or dialog box. A mnemonic then allows a user to interact with an application program without using a pointing device (e.g., a mouse). Thus, mnemonics act as shortcuts to functions in application programs. Mnemonics are most often found in menu choices but can be used any place where a control has an associated text label.

Assigning mnemonics when developing a graphical user interface (GUI) can be quite a laborious task. For example, when doing so, a software developer has to be aware of all standard mnemonic character assignments, numerous assignment rules as well as checking for duplicate assignment of characters. Oftentimes, the scope of a set of mnemonic character assignments is limited to a particular region of the user interface. That is, a mnemonic character should be unique within a dialog box or a given level of a menu. Nonetheless, since many text labels are common to many dialog boxes in an application program, it is usually desirable to have mnemonic assignment to these common labels be as consistent as possible (i.e., to have them be the same across the different dialog boxes or menus).

Thus, what is needed is an apparatus and method of automatically assigning mnemonics based on conventions and rules as well as of automatically checking for consistency of mnemonic character assignments across different dialog boxes.

SUMMARY OF THE INVENTION

The present invention provides a method, system and apparatus for automatically assigning mnemonics to text strings in a GUI. First, all text strings used in the GUI that are associated with control elements requiring mnemonics are stored in a table. Then using common assignment rules, each text string is automatically assigned a unique mnemonic. Text strings that are generally assigned particular mnemonics (i.e., standard mnemonics) are assigned those standard mnemonics. Each mnemonic used is registered into another table to ensure against duplication of mnemonics.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5, 6 and 7 depict text labels used a GUI.

FIG. 8 illustrates a plurality of standard mnemonics.

FIG. 9 illustrates a pseudocode that may be used with the present invention.

DETAILED DESCRIPTION OF THE PREFERRED EMBODIMENT

Figure 1:
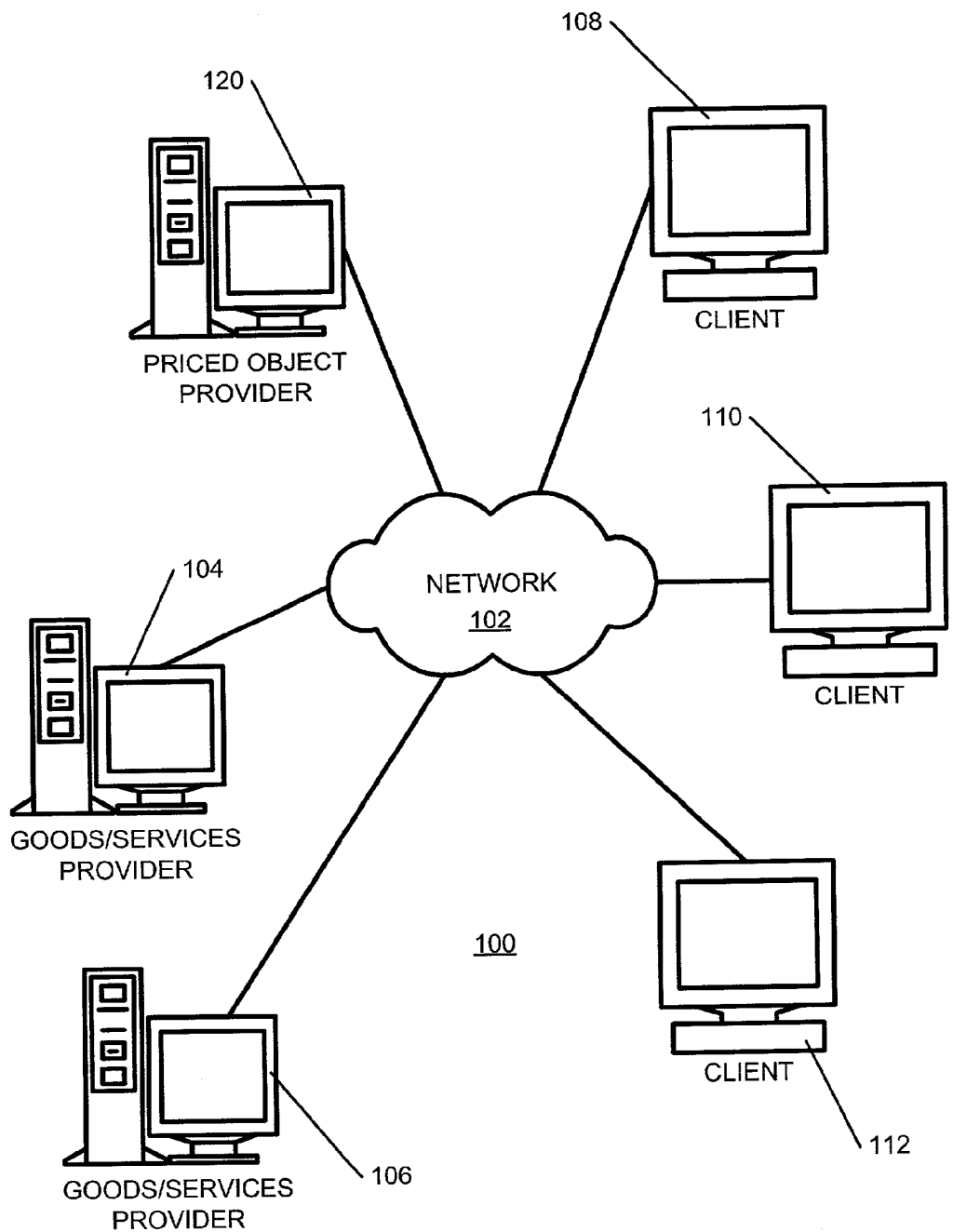
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example,.an intranet, a local area network (LAN), or a wide area network (WAN). FIG. 1 is intended as an example, and not as an architectural limitation for the present invention.

Figure 2:
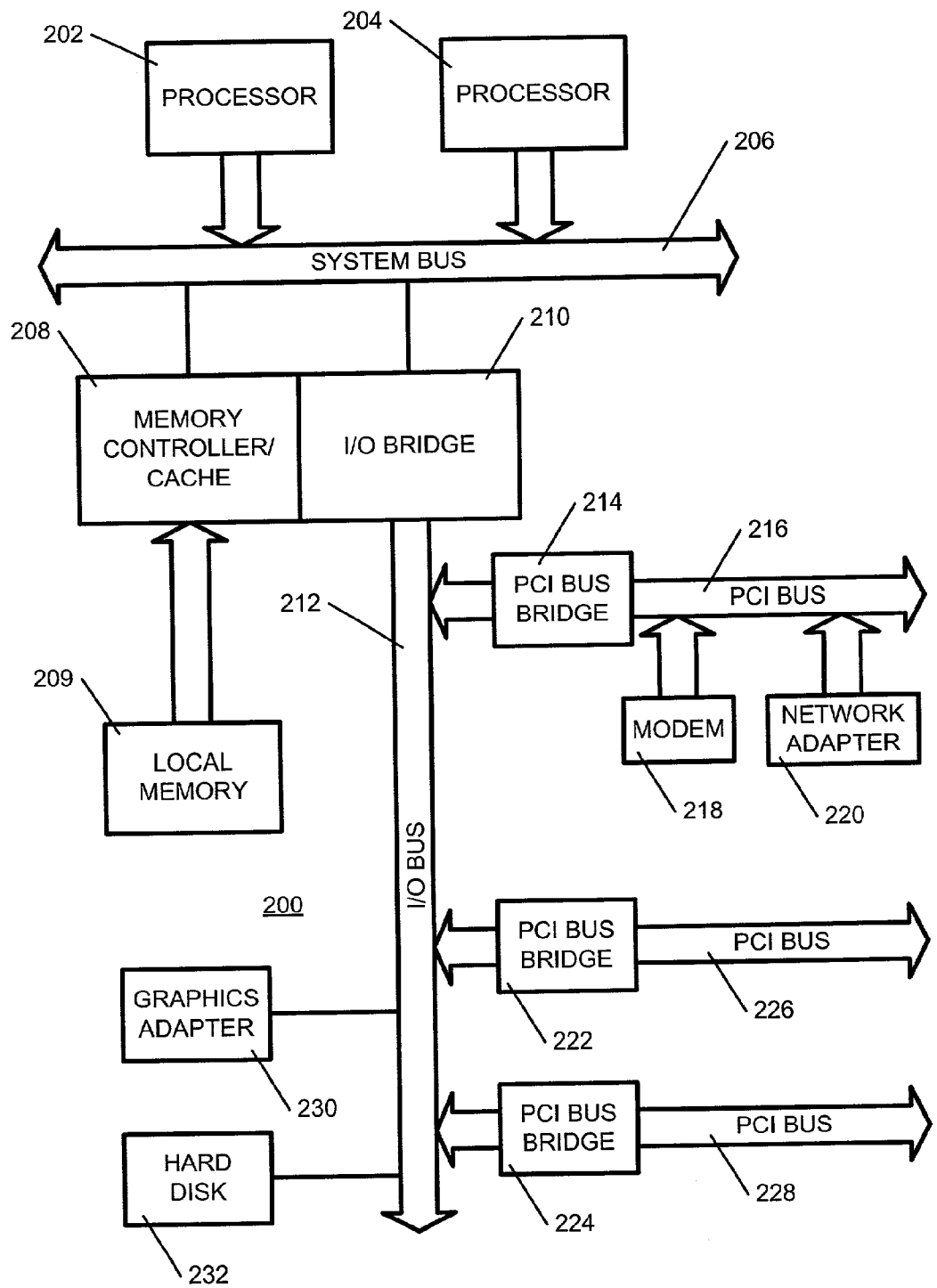
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
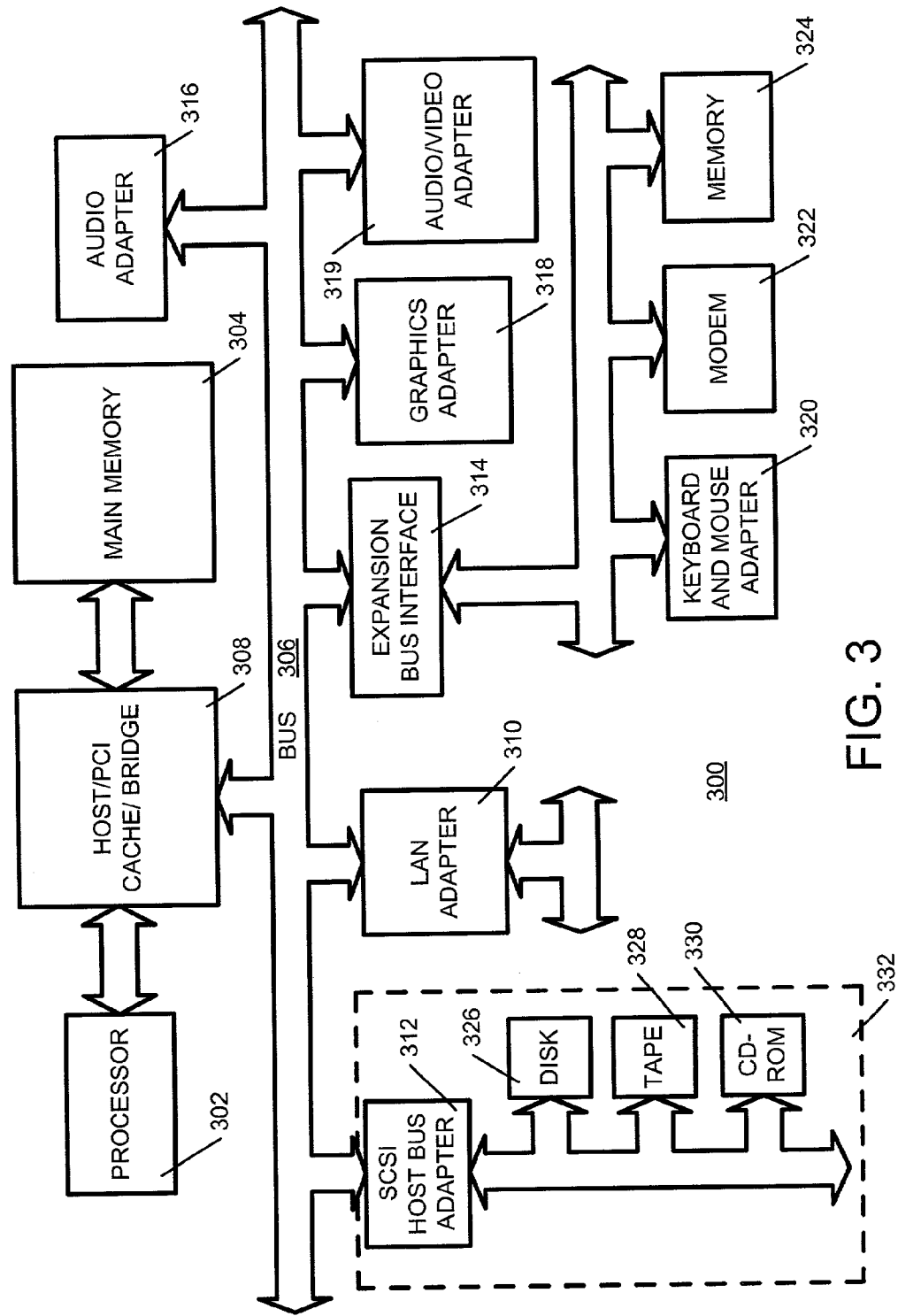
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus and method of automatically assigning mnemonics in a program code according to conventions and rules. The present invention also checks for mnemonic character assignments across modules to ensure that maximum consistency exists among different components of a GUI. Although the invention may preferably be local to client systems 108, 110 and 112 of FIG. 1, it may nonetheless, be local to server 104 or to both the server 104 and clients 108, 110 and 112. Consequently, the present invention may reside on any data storage medium (i.e., floppy disk, compact disk, hard disk, ROM, RAM, etc.) in any one of the computer systems.

To better understand the invention, a word processor will be used as an example. Most word processors have a File, Edit, Format, Table and Help pull down menus. The underscored letters are the mnemonics. That is, pressing on the "alt" key and an underscored letter will pull down an appropriate menu. For example, if the "alt" key and the letter "f" are depressed the file menu will be pulled down. When the "file" menu is pulled down, other mnemonics may be revealed. Likewise, when the "edit", "format", "table" and "help" pull down menus are displayed, other mnemonics may be revealed.

Figure 4:
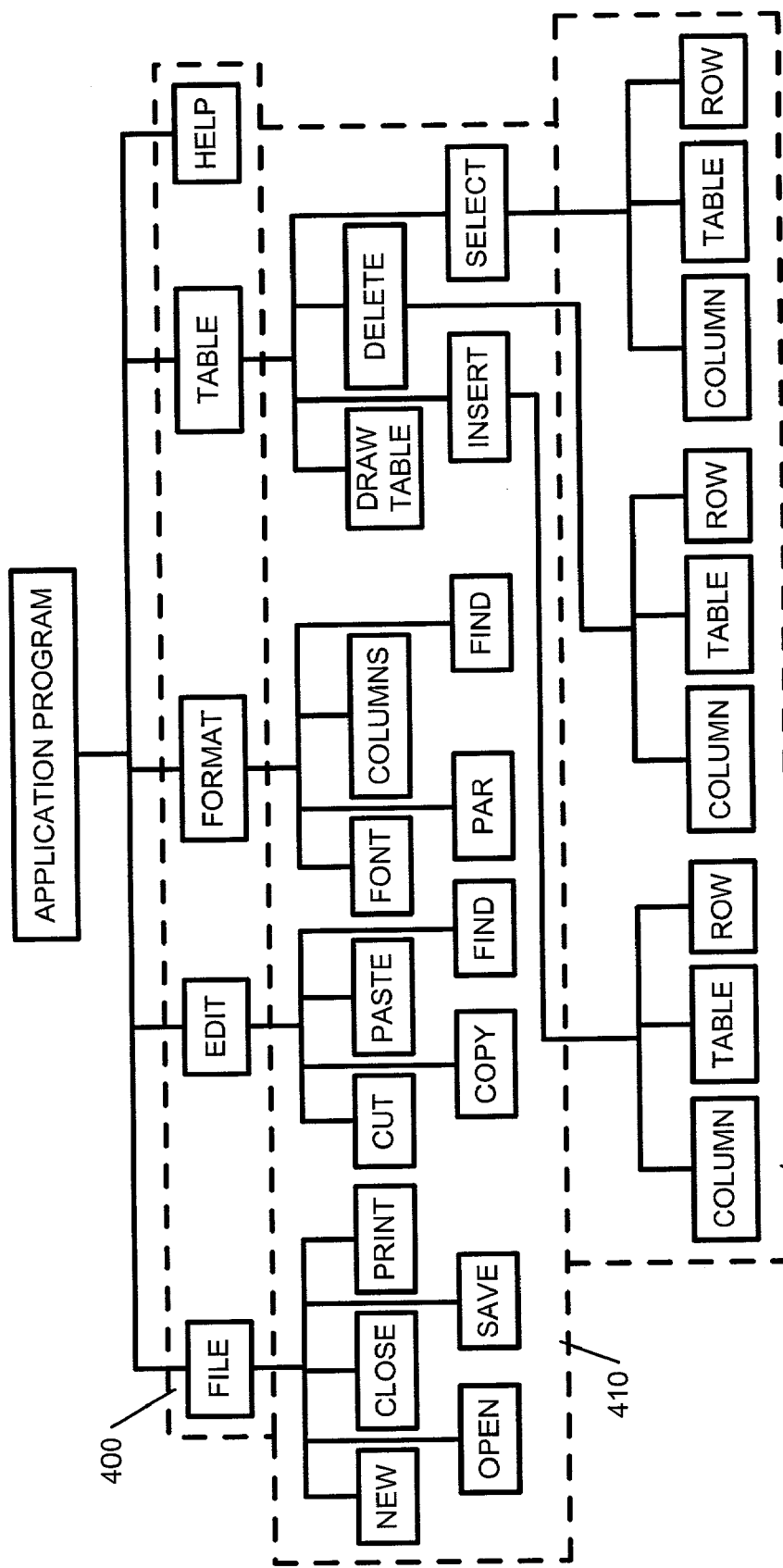
FIG. 4 illustrates a plurality of menu levels of an application program.

In the present disclosure, any pull down menu that may emanate from any one of the afore-mentioned pull down menus will henceforth be referred to as nested pull down menus. Note that there may be a plurality of pull down menus at a level as well as many different levels of nested pull down menus. FIG. 4 illustrates this point. In FIG. 4, menu level 400 is at a first level, menu level 410 is at a second level and menu level 420 is at a third level. Menu levels 410 and 420 are nested levels.

Text labels that are to be assigned mnemonics (i.e., file, edit, insert, format, table etc.) are usually stored in a "label" or "message" file. This allows the text labels to be translated into different languages. There may be a label file for each menu level or one for all. The invention will be described using a table for each one of the menu levels.

FIGS. 5, 6 and 7 contain a table for the first, second and third menu levels, respectively. In the tables, each text label is associated with a mnemonic. In the nested levels (see FIGS. 6 and 7), each parent pull down menu from which the text labels emanate is also identified. Along with the tables in FIGS. 5, 6 and 7 other tables are used with the invention.

FIG. 8 illustrates a table of standard mnemonics. In this table, mnemonics such as "f" for file, "e" for edit, "s" for save, "p" for print, "c" for copy and "h" for help are entered. Note that the list is not all-inclusive and should be taken as an example of a list of items that may be found therein.

In addition, three other tables may be used (not shown). The tables may include CharactersUsed, Consonants and ReoccurringStrings. The CharactersUsed table is to store a list of characters used in the GUI. The Consonants table is used to store a list of consonants that have been used as mnemonics and the ReoccuringStrings table is used to store a list of reoccurring strings in the GUI. The list of consonants is a list of characters, sorted in the order of least frequently occurring to most frequently occurring characters in the GUI. The list of reoccurring strings is used to track the assignment of mnemonics to reoccurring text strings within the GUI.

FIG. 9 is pseudocode of a process that may be used with the invention. Before the process represented by the pseudocode is run, the label files (i.e., FIGS. 5, 6 and 7) should be tilled with the text strings. The mnemonic character assignment for each of the strings should be set to a null value. The list of characters used should be set to empty. Then, the text strings in the label files are compared with each other. All strings that have multiple occurrences throughout the GUI but are not in the list of standard mnemonics are entered in the table containing the list of reoccurring strings and sorted according to their frequency of occurrences. All entries with fewer than a threshold number of occurrences are deleted.

The process represented by the pseudocode shown in FIG. 9 is then run to assign a mnemonic to each string found in each user interface component (i.e., each item in the first, second and third menu levels of FIG. 4). The tables displayed in FIGS. 5, 6 and 7 are then updated each time a mnemonic is assigned to a text string. The program will be run as many times as there are items in the label files. Each time a mnemonic is assigned to a text string, a process in the application program is called. The process is a process that sets mnemonics to the text strings in the GUI, which most application programs have.

Upon completion, each duplicate text string in the GUI will have a common mnemonic assigned thereto. Furthermore, each mnemonic will be unique to a text string and text strings that are commonly assigned particular mnemonics (i.e., standard mnemonics) will be assigned those standard mnemonics.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of automatically assigning mnemonics to text strings in a GUI comprising the steps of:
    creating a plurality of files containing each a list of the text strings for a menu level, each sub-level menu emanating from a text string of a parent menu level, each file containing a list of the text strings of a sub-level menu identifying the text string of the parent menu level from which the sub-level menu emanates;
    determining all reoccurring strings across all menu levels; and
    automatically assigning each text string in the list a unique mnemonic by (1) assigning a mnemonic to each text string one menu level at a time, the assigned mnemonic being a character from a list of characters used in the GUI, (2) entering the assigned mnemonics in a second table each time text strings on a menu level have been assigned mnemonics the second table for keeping track of all characters that have been used as mnemonics and (3) ensuring consistency of mnemonic assignments to reoccurring strings across the menu levels by entering into a third table a list of the determined reoccurring strings and the mnemonics assigned thereto.

2. The method of claim 1 wherein the assignment step includes the step of assigning conventional mnemonics to conventional text strings.

3. The method of claim 2 wherein the mnemonics are alphabetical letters.

4. The method of claim 3 wherein consonants are used first then vowels.

5. A computer program product on a computer readable medium for automatically assigning mnemonics to text strings in a GUI comprising;
    code means for creating a plurality of files containing each a list of the text strings for a menu level, each sub-level menu emanating from a text string of a parent menu level, each file containing a list of the text strings of a sub-level menu identifying the text string of the parent menu level from which the sub-level menu emanates;
    code means for determining all reoccurring strings across all menu levels; and
    code means for automatically assigning each text string in the list a unique mnemonic by (1) assigning a mnemonic to each text string one menu level at a time, the assigned mnemonic being a character from a list of characters used in the GUI, (2) entering the assigned mnemonics in a second table each time text strings on a menu level have been assigned mnemonics, the second table for keeping track of all characters that have been used as mnemonics and (3) ensuring consistency of mnemonic assignments to reoccurring strings across the menu levels by entering into a third table a list of reoccurring strings and the mnemonics assigned thereto.

6. The computer program product of claim 5 wherein the assignment code means includes code means for assigning conventional mnemonics to appropriate text strings.

7. The computer program product of claim 6 wherein the mnemonics are alphabetical letters.

8. The computer program product of claim 7 wherein consonants are used first then vowels.

9. A computer system for automatically assigning mnemonics to text strings in a GUI comprising:
    at least one storage device for storing code data; and
    at least one processor for processing the code data to create a plurality of files containing each a list of the text strings for a menu level, each sub-level menu emanating from a text string of a parent menu level, each file containing a list of the text strings of a sub-level menu identifying the text string of the parent menu level from which the sub-level menu emanates, to determine all reoccurring strings across all menu levels, and to automatically assign each text string in the list a unique mnemonic by (1) assigning a mnemonic to each text string one menu level at a time, the assigned mnemonic being a character from a list of characters used in the GUI, (2) entering the assigned mnemonics in a second table each time text strings on a menu level have been assigned mnemonics, the second table tar keeping track of all characters that have been used as mnemonics and (3) ensuring consistency of mnemonic assignments to reoccurring strings across different menu levels by entering into a third table a list of reoccurring strings and the mnemonics assigned thereto.

10. The computer system of claim 9 wherein the code data is further processed to assign conventional mnemonics to appropriate text strings.

11. The computer system of claim 10 wherein the mnemonics are alphabetical letters.

12. The computer system of claim 11 wherein consonants are used first then vowels.

13. A method of automatically assigning mnemonics to text strings in a GUI comprising the steps of:

creating a plurality of tables containing each a list of the text strings for a menu level, each sub-level menu emanating from a text string of a parent menu level, each table containing a list of the text strings of a sub-level menu identifying the text string of the parent menu level from which the sub-level menu emanates;

identifying a list of conventional mnemonics and a list of conventional text strings;

assigning each conventional mnemonic in the list of conventional mnemonics to a conventional text string in the list of conventional text strings;

entering into a first table a list of characters used in the GUT, the list of characters being sorted from least frequently occurring to most frequently occurring in the GUI;

entering into a second table all characters that have been used as a mnemonic in the GUI, the second table for keeping track of all characters that have been used as mnemonics;

determining all reoccurring strings across all menu levels; and automatically assigning each text string in the list, to which a mnemonic has not yet been assigned, a unique mnemonic by (1) assigning a mnemonic to each text string one menu level at a time, the assigned mnemonic being a character from the list of characters in the first table, (2) updating the second table by entering the assigned mnemonics in the second table each time text strings on a menu level have been assigned mnemonics and (3) ensuring consistency of mnemonic assignments to reoccurring strings across the menu levels by entering into a third table a list of reoccurring strings and the mnemonics assigned thereto.

* * * * *